United States Patent [19]

Rice

[11] Patent Number: 4,972,193
[45] Date of Patent: Nov. 20, 1990

[54] TARGET RECOGNITION

[75] Inventor: David E. Rice, Chelmsford, United Kingdom

[73] Assignee: The General Electric Company, p.l.c., London, United Kingdom

[21] Appl. No.: 464,595

[22] Filed: Jan. 12, 1990

Related U.S. Application Data

[63] Continuation of Ser. No. 238,291, Aug. 5, 1988, abandoned.

[51] Int. Cl.$^5$ .......................... G01S 7/295; G06K 9/46; G06K 9/80
[52] U.S. Cl. ...................................... 342/90; 342/192; 382/18; 382/39
[58] Field of Search ...................... 382/18, 39; 342/90, 342/192

[56] References Cited

U.S. PATENT DOCUMENTS

| 3,896,434 | 7/1975 | Sirven | 342/192 X |
| 4,084,148 | 4/1978 | Koshikawa | 342/192 X |
| 4,323,880 | 4/1982 | Lucas | 382/39 X |
| 4,470,048 | 9/1984 | Short, III | 342/192 X |
| 4,603,331 | 7/1986 | Wehner | 342/192 |
| 4,707,697 | 11/1987 | Coulter et al. | 342/90 X |
| 4,881,079 | 11/1989 | Peregrim | 342/90 X |

FOREIGN PATENT DOCUMENTS

| 0100141 | 2/1984 | European Pat. Off. . |
| 0239022 | 9/1987 | European Pat. Off. . |

Primary Examiner—Gilberto Barrón, Jr.
Attorney, Agent, or Firm—Spencer & Frank

[57] ABSTRACT

Apparatus for recognizing a target such as a ship comprises a radar for successively sweeping the target to obtain input data representing the return amplitude from different target angles; a filter for selecting from the input data those significant ranges at which there is a significantly high amplitude; and a range difference compiler for identifying the frequency of occurrence of each of several range differences between pairs of the significant ranges, the most common range differences (expressed as a histogram) being representative of the distances between major reflectors on the target and thus distinctive of the target.

12 Claims, 6 Drawing Sheets

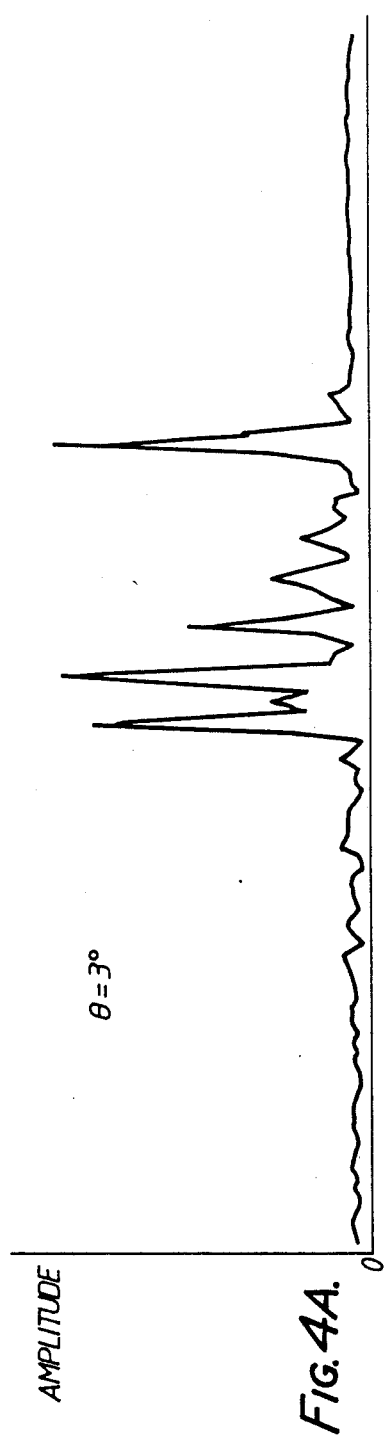
FIG. 4A. θ=3°
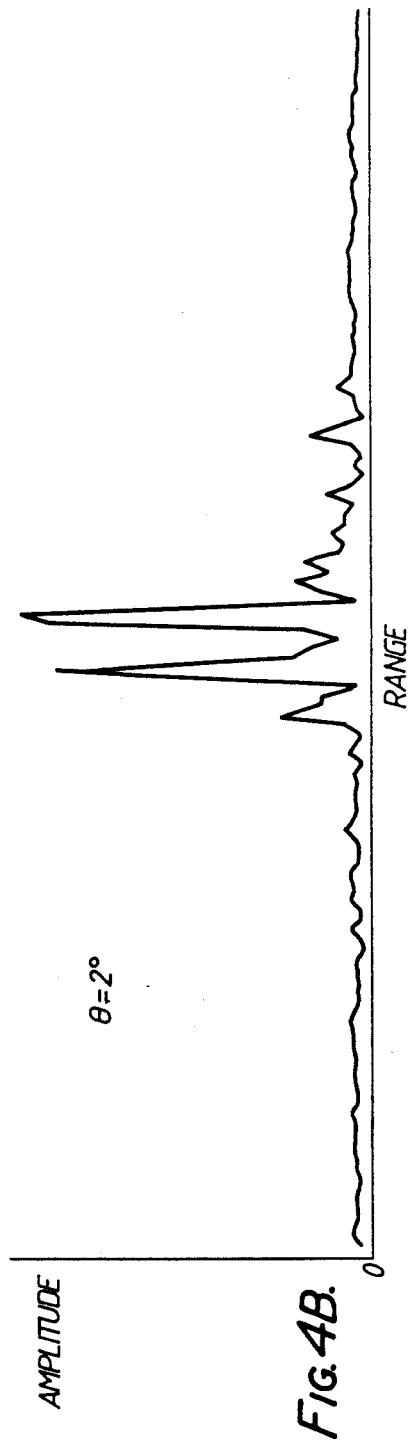
FIG. 4B. θ=2°

TARGET RECOGNITION

This application is a continuation of application Ser. No. 238,291, filed Aug. 5, 1988, now abandoned.

BACKGROUND OF THE INVENTION

1. Field of the Invention

The present invention relates to a method and apparatus for sweeping a target with a range-finder such as radar, and using the return signals to identify characteristic features of the target. The invention may be used in the compilation of target recognition data for known targets, in the identification in real time of a particular target, or in the discrimination in real time between a number of possible targets. The invention has particular application in high resolution radar range finding.

2. Description of the Prior Art

As disclosed in our copending UK patent application no. 8615683, return signals from a high resolution radar may be plotted as dots, whose size is proportional to return signal amplitude, on a graph of range against the angle between the target and the line between the target and the radar. From such a graph it is possible to connect the more significant dots to form curves which are characteristic of the target. In such a method, errors arise from the motion of the target during the accumulation of the range data. A target point, for example the funnel of a ship, might give rise to an irregular curve instead of a portion of a sine wave, making the recognition process more difficult.

SUMMARY OF THE INVENTION

According to a first aspect, therefore, the invention provides a method of recognising a target comprising: successively sweeping the target with a range-finder to obtain input data representing the return amplitude at different ranges within the target and from different target angles within a bracket of angles; adjusting the input data to correct for target motion so that the said ranges are defined relative to a selected fixed part of the target; selecting from the adjusted input data those significant ranges at which there is a significantly high amplitude; and identifying patterns in the selected data characteristic of the target.

Such a method, however, does not allow for rapid target recognition in real time.

According to a second aspect, the invention provides a method of recognising a target, comprising: successively sweeping the target with a range-finder to obtain input data representing the return amplitude at different ranges within the target and from different target angles within a bracket of angles; selecting from the input data those significant ranges at which there is a significantly high amplitude; and identifying the frequency of occurrence of each of several range differences between pairs of the significant ranges over the bracket of angles, the most common range differences being representative of the distances between major reflectors on the target and thus distinctive of the target.

This method makes use of the fact that targets, for example ships, have well-defined regions which strongly reflect radar transmissions and which are spaced by distances along the length of the target characteristic of the target. The method is statistical in nature, and is effected easily by digital computer at high speed.

The method preferably comprises, immediately preceding the selecting step, the step of adjusting the input data to correct for target motion so that the said ranges are defined relative to a selected fixed part of the target.

The method preferably comprises tracking the target to obtain crude range data for the adjusting step.

The adjusting step preferably uses a correlation process to identify a subset of the input data representative of a major reflector on the target which is to constitute the said fixed part thereof, and, for each datum of the input data, correcting the range by subtracting from it the range of the said fixed part at the relevant target angle.

In order to discriminate between several possible targets, for example in a missile guidance system, the method may further comprise the step of comparing the said range differences with previously-stored reference data containing range difference information representative of potential targets, in order to identify the most likely target.

Where the target is known, the same method could be used, but instead of identifying the most likely target, the method would include the step of storing the range differences to provide a target identification reference.

According to a further aspect, the invention provides apparatus for recognising a target, comprising: a range-finder for successively sweeping the target to obtain input data representing the return amplitude at different ranges and from different target angles; means for selecting from the input data those significant ranges at which there is a significantly high amplitude; and means for identifying the frequency of occurrence of each of several range differences between pairs of the significant ranges, the most common range differences being representative of the distances between major reflectors on the target and thus distinctive of the target.

In order that the invention may be better understood, a preferred embodiment of the invention will now be described, by way of example only, with reference to the accompanying drawings, in which:

BRIEF DESCRIPTION OF THE DRAWINGS

FIGS. 4a and 4b are graphs of signal amplitude against range for the same target inclined at two slightly different target angles to the line joining the target and the radar;

FIG. 7b is a histogram, to an enlarged scale, corresponding to part of the data of the histogram of FIG. 7a.

DESCRIPTION OF THE PREFERRED EMBODIMENT

In the example to be described with reference to the accompanying drawings, the intended target is a ship, tracked by radar apparatus from a variable horizontal distance and from a variable horizontal angle relative to the ship's longitudinal axis. The range R of a particular scattering centre a distance a from a reference point on the ship and at an angle x to it is given by:

$R = R_s + a \cos(x+\theta)$, where $\theta$ is the angle between the ship's longitudinal axis and the line between the ship and the radar; and $R_s$ is the range of the reference point.

Since in most ships the principal scattering centres will lie on the ship's longitudinal axis or very close to it, the angle x will be ignored in the present discussion, but clearly the method could be extended to take this angle into account.

Figure 2:
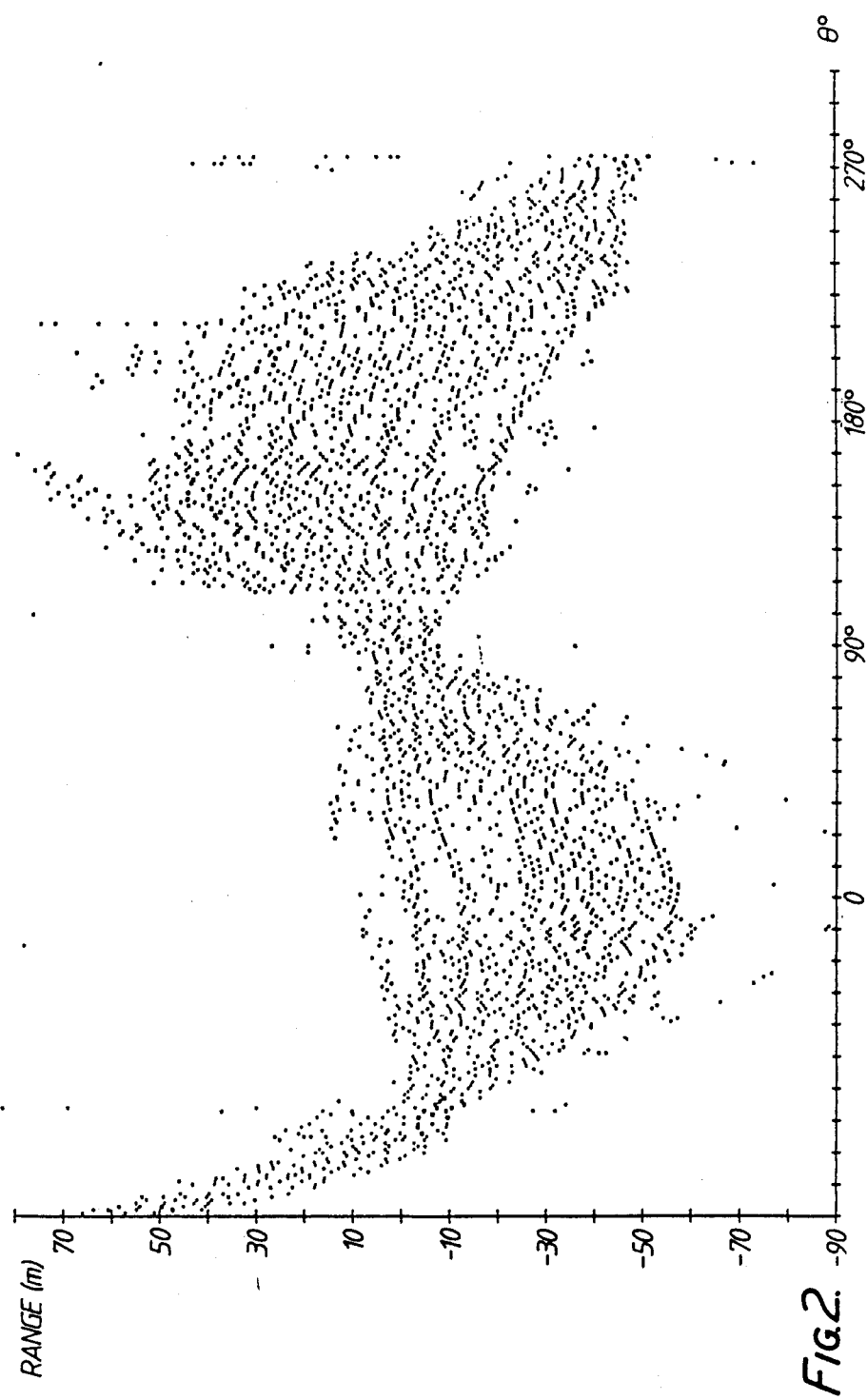
FIG. 2 is a graph of radar returns in which range is plotted against target (ship) angle.
Figure 3:
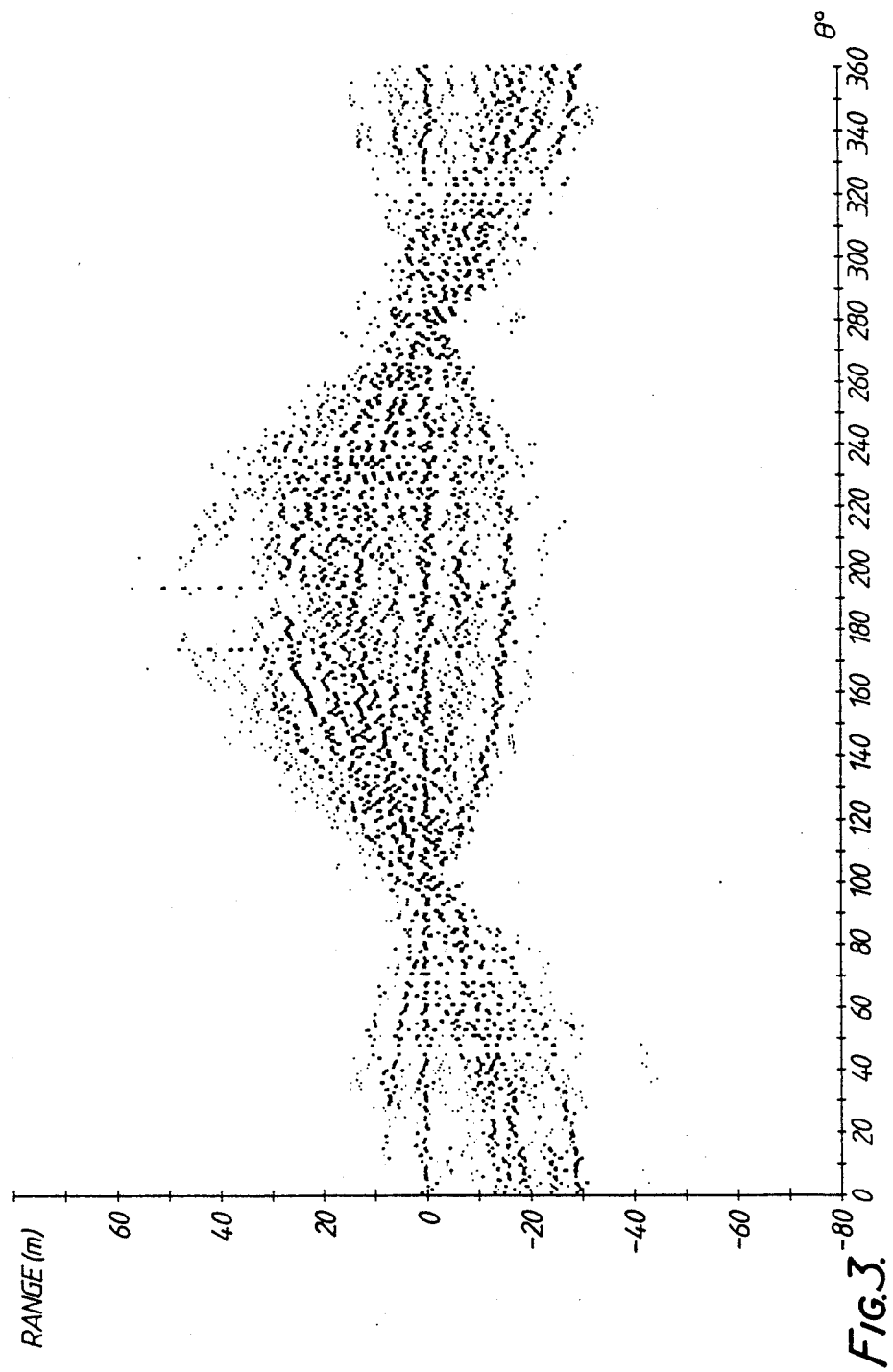
FIG. 3 corresponds to the graph of FIG. 2, but represents the same data after correction for target motion.

FIG. 2 illustrates raw input data from a scan of a particular ship which has travelled a full circle. The data are derived from large numbers of scattering centres at different ranges, the ranges being normalised relative to an approximation of the range $R_s$ obtained by crude, low-resolution tracking radar, or from the centroid of the high resolution returns. Each spot of FIG. 2 represents a return signal above a predetermined threshold, the size of the spot being proportional to the return signal amplitude. The motion of the ship over the period of the scan causes errors in angle and range, and in order to make use of the data it is possible, although not essential, to make appropriate corrections to each datum so that each range is defined relative to a particular scattering centre i.e. to a selected fixed part of the ship. FIG. 3 illustrates the input data of FIG. 2 after processing for target motion in a target motion corrector. Using digital processing techniques which are already known in themselves, a high amplitude scattering centre, tracing a recognisable sinusoidal path through the scan of FIG. 2, is identified, and is used as the reference point. For each angle $\theta$ of the ship, the range of this reference scatterer, measured along the ordinate axis of FIG. 2, is subtracted from the ranges of all the other points. This yields the data in the corrected format shown in FIG. 3. In FIG. 3, the line for zero range represents the returns from the reference scatterer, and the sinusoidal curves which are now recognisable represent other major scattering centres.

Figure 1:
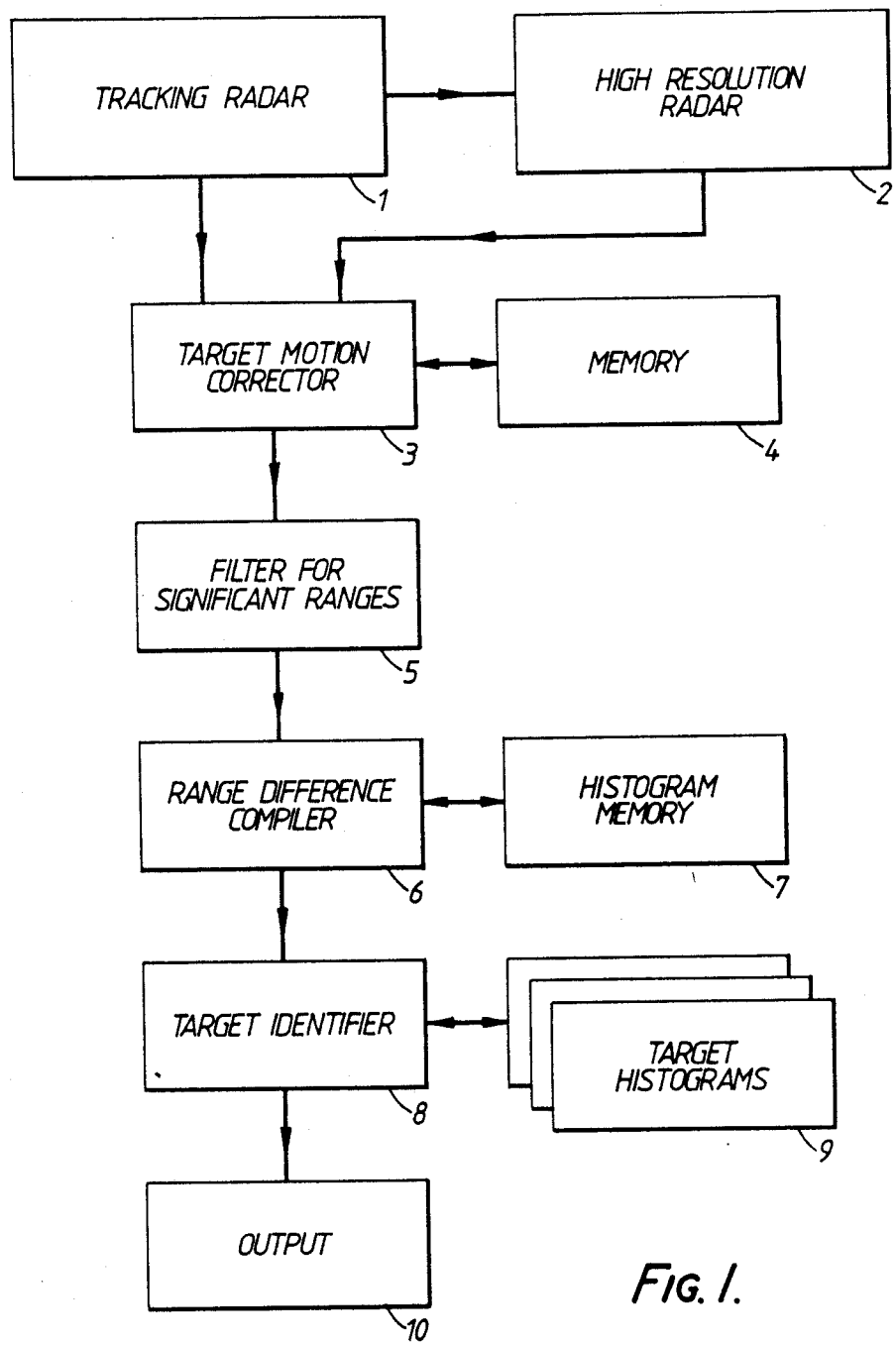
FIG. 1 is a block diagram of apparatus embodying the invention.

With reference to FIG. 1, the returns providing the input data of FIGS. 2 and 3 are derived from a high resolution radar 2, and the crude tracking measurement is provided by a tracking radar 1 of low resolution such as a General Electric AN/AP 6-67, or from the centroid of the high resolution returns. The tracking radar 1 also provides the ship angle The target motion corrector 3 receives input data from the high resolution radar 2 corresponding to those illustrated in FIG. 2, receives ship angle $\theta$ information from the tracking radar 1, and processes the information by finding a high amplitude scattering centre tracing a recognisable sinusoidal path through the scan and adjusting the data range values so that the scattering centre is used as a reference position as described above, to derive the corrected data of FIG. 3, which are stored in a memory 4.

This corrected information could be plotted as a graph of amplitude peaks against ship angle, in an analogous manner to that described in our copending patent application referred to above, and analysed manually. The sinusoidal lines of continuity shown in FIG. 3 could be compared visually with corresponding recorded data relating to prospective targets. However, the preferred method of target recognition, in real time, involves the use of digital data processing, as will now be described. A suitable computer for carrying out such data processing would be a VAX1170.

By way of illustration, the variation of signal amplitude with range for ship angles of 3° and 2°, for the same ship, is shown in FIGS. 4a and 4b respectively. It is clear from this that the amplitude at a particular characteristic range varies widely with the ship angle, so that a statistical method of correlating the input data is necessary in order to obtain useful information characteristic of the ship.

As is conventional in radar, a sweep provides data at each of a number of different range gates, denoted by numbers. In the present example, each range sweep contains about 130 range gates, so that a 360° scan with measurements taken at every degree yields nearly fifty thousand measurements of amplitude. The data processing technique employed in this embodiment of the invention relies on the discovery that, although the amplitude of major scatterers varies considerably with ship angle, the spacing between major scatterers remains relatively consistent. The technique, which uses a correlation procedure which concentrates on the spacing between major scatterers, is designed to cope with large numbers of input data, for example fifty thousand measurements of amplitude for each scan.

Figure 5:
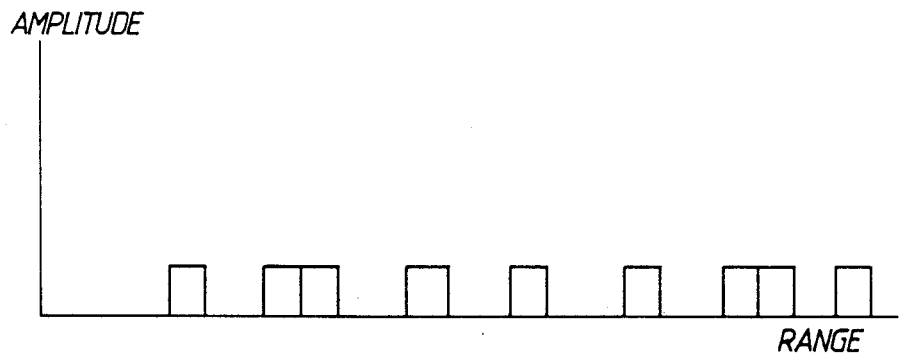
FIG. 5 represents the return signal data for one particular target angle of the data shown in FIG. 3, and processed so as to include in binary form only those significant ranges at which there is a significantly high amplitude.

The data of FIG. 3, stored in memory 4, are filtered in a filter 5 in order to select only the data corresponding to significant ranges. That is, the ranges of major scatterers. The filter 5 operates by a data processor scanning the data of FIG. 3 to derive, in binary form, for each ship angle, the positions relative to the scan start of the n highest amplitudes. This output is illustrated in FIG. 5, where n=9. Those amplitudes with a rank lower than these, i.e. with an amplitude rank exceeding 9, are rejected.

An alternative selection method would be to select only those amplitudes above a predetermined threshold.

With reference again to FIG. 1, a range difference compiler 6 then processes the correlated data into a histogram identifying the frequency of occurrence of all the possible range differences, i.e. gate separations, between the n major scatterers. This histogram is stored in a histogram memory 7.

Where the range of ship angles is substantial, a correction is made by multiplying each gate separation by the secant of the ship angle $\theta$. This correction is performed by the range difference compiler 6 for each of the ship angles $\theta$ and for each gate separation (of which there will in general be $\frac{1}{2}n(n-1)$ at each ship angle).

Figure 6:
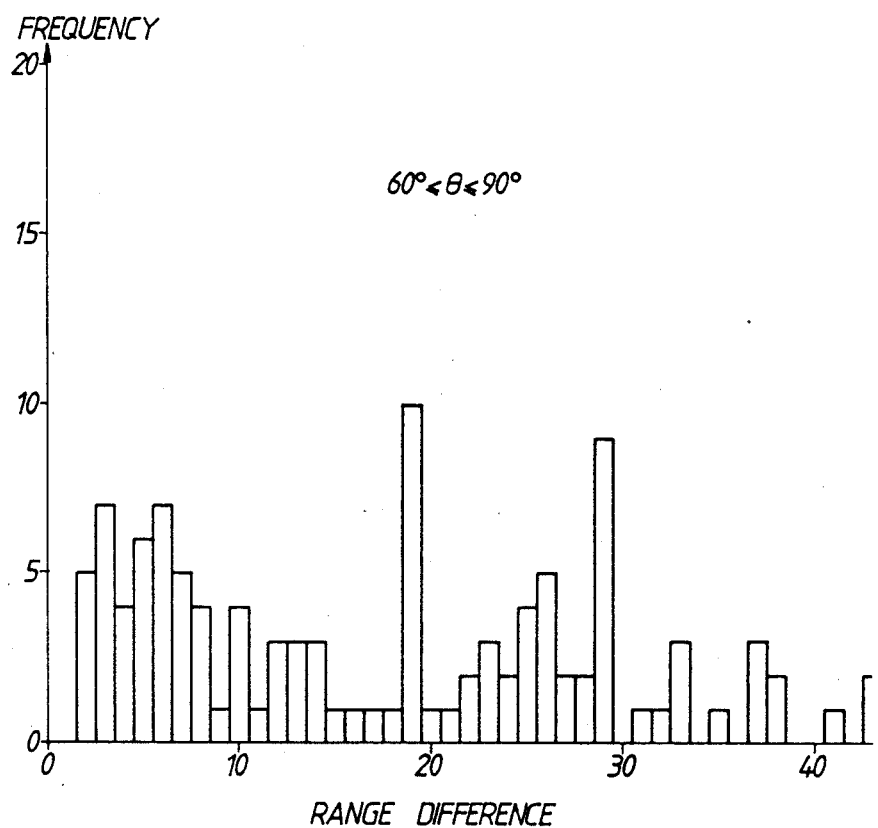
FIG. 6 is a histogram showing the frequency (number of occurrences) of each of all the possible differences in range in the binary data, for target angles between 60° and 90°.

One example is shown in FIG. 6 in which the data from several significant scatterers is correlated for all ship angles between 60° and 90°, and the frequency of occurrences of range differences from 0 to 42 is plotted. It is clear from FIG. 6 that, for this ship, and for this range of angles, 19 and 29 are very common range differences, and accordingly are likely to represent the distances between two pairs of major scatterers on the ship.

Figure 7A:
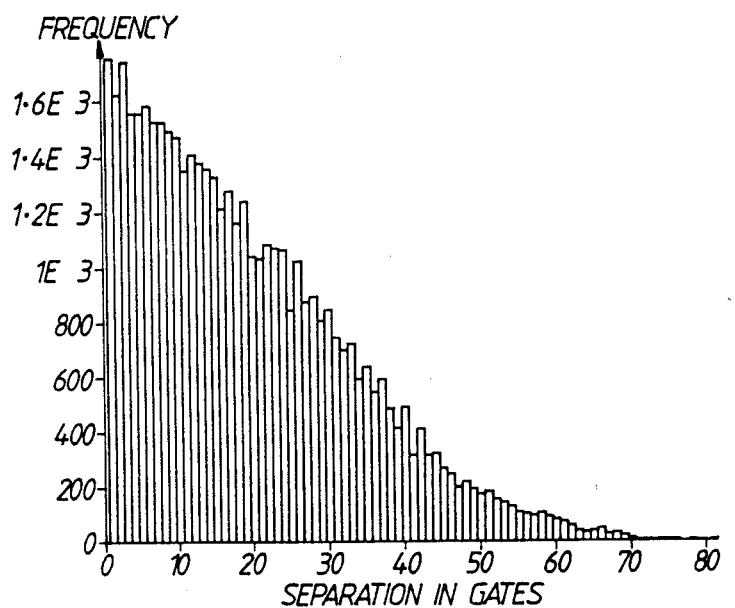
FIG. 7a is a histogram corresponding to that of FIG. 6, but carried out in respect of a much larger number of significant ranges.
Figure 7B:
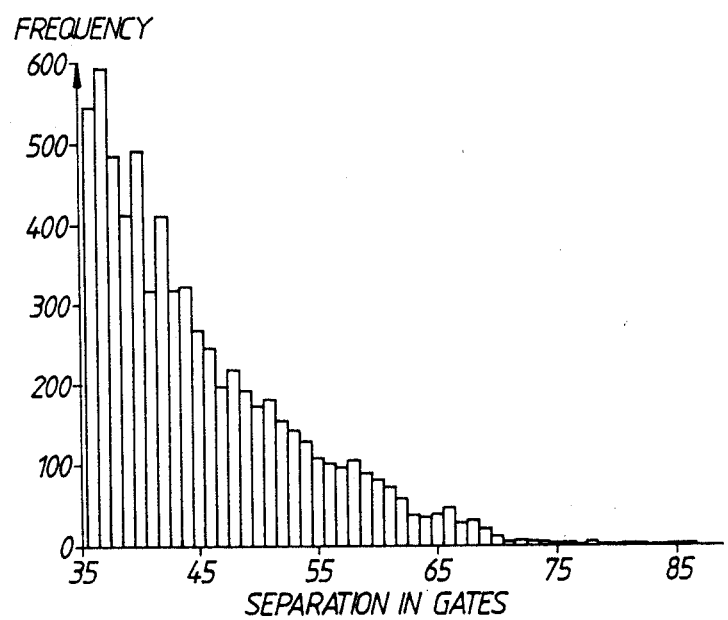

The narrower the band of ship angles used in the formation of the histogram, the more prominent is likely to be the effect of particular pairs of scatterers. FIG. 7a shows the range difference histogram for the top fifty amplitudes taken over an angle range of 300° to 60° (clockwise across the bow of the ship), and FIG. 7b shows the same histogram but for gate separations of 35 and above. Potentially interesting gate separations are visible in FIG. 7b at the 37, 40 and 42 gate separation figures.

The histogram memory 7 may be written into a permanent reference memory for subsequent use as a target identification reference, in the same radar system or in other systems. Alternatively, the histogram stored in the memory 7 may be compared, by a standard correlation method, in a target identifier 8, with previously-stored reference target histograms 9 representing potential targets. The output 10 from the target identifier 8 is representative of the most likely target, i.e. the one whose histogram has the best match.

Where for example the radar system is carried by a missile seeking a particular target, the target histogram could be stored in the target histogram store 9, and the missile could be guided so as to optimise the match between the measured histogram 7 and the target histogram 9. This allows for discrimination between targets. Further, since the histogram represents a range of target angles, the missile could be guided so as to adopt a preselected approach angle to the target by maximising the match between the histograms, provided that the target has already been located.

The invention allows for the rapid processing of large quantities of data, and, by setting simple criteria for identification, provides a fast method of target identification. Identification criteria are based on physical spacings between high scatter areas, so the method is not dependent on the frequency of the radar; this allows for a transfer across frequency bands, e.g. from long range surveillance to short-range homing.

I claim:

1. A method of recognising a target, comprising: successively sweeping the target with a range-finder to obtain input data representing the return amplitude at different ranges within the target and from different target angles within a bracket of angles; selecting from the input data those significant ranges at which there is a significantly high amplitude; and identifying the frequency of occurrence of each of several range differences between pairs of the significant ranges over the bracket of angles, the most common range differences being representative of the distances between major reflectors on the target and thus distinctive of the target.

2. A method according to claim 1, comprising, immediately preceding the selecting step, the step of adjusting the input data to correct for target motion so that the said ranges are defined relative to a selected fixed part of the target.

3. A method according to claim 2, comprising tracking the target to obtain crude range data for the adjusting step.

4. A method according to claim 2, wherein the adjusting step comprises using a correlation process to identify a subset of the input data representative of a major reflector on the target which is to constitute the said fixed part thereof, and, for each datum of the input data, correcting the range by subtracting from it the range of the said fixed part at the relevant target angle.

5. A method according to claim 1 wherein the step of selecting the significant ranges comprises identifying, for each target angle, the ranges at which the amplitude exceeds a predetermined amplitude rank or threshold, those ranges constituting the significant ranges.

6. A method according to claim 1 wherein the range is gated at a plurality of numbered range gates, and the frequency of occurrence is obtained of each of the possible numerical differences between the range gate numbers.

7. A method according to claim 1 further comprising the step of comparing the said range differences with previously-stored reference data containing range difference information representative of potential targets, in order to identify the most likely target.

8. A method according to claim 1 further comprising the step of storing the range differences to provide a target identification reference.

9. Apparatus for recognising a target, comprising: a range-finder for successively sweeping the target to obtain input data representing the return amplitude at different ranges and from different target angles means for selecting from the input data those significant ranges at which there is a significantly high amplitude and means for identifying the frequency of occurrence of each of several range differences between pairs of the significant ranges, the most common range differences being representative of the distances between major reflectors on the target and thus distinctive of the target.

10. Apparatus according to claim 9, further comprising means for adjusting the input data to correct for target motion so that the said ranges are defined relative to a selected fixed part of the target.

11. Apparatus according to claim 9 wherein the range-finder is a pulsed radar.

12. A method of recognising a target comprising: successively sweeping the target with a range-finder to obtain input data representing the return amplitude at different ranges within the target and from different target angles within a bracket of angles; adjusting the input data to correct for target motion so that the said ranges are defined relative to a selected fixed part of the target; selecting from the adjusted input data those significant ranges at which there is a significantly high amplitude., and indentifying patterns in the selected data characteristic of the target.

* * * * *